(12) United States Patent
Kim

(10) Patent No.: US 6,230,321 B1
(45) Date of Patent: May 8, 2001

(54) METHOD OF SIMULTANEOUS DISPLAY OF TWO PICTURES FOR INTERNET-FUNCTIONAL TELEVISION RECEIVER

(75) Inventor: Woon Gyu Kim, Taegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/059,257

(22) Filed: Apr. 14, 1998

(30) Foreign Application Priority Data

Apr. 14, 1997 (KR) .............................. 1997-13658

(51) Int. Cl.⁷ ........................................ G06F 3/00
(52) U.S. Cl. ..................... 725/37; 345/342; 345/346; 348/564
(58) Field of Search .................... 348/584–565; 345/326–328, 341, 342, 346, 356, 330; 704/217

(56) References Cited

U.S. PATENT DOCUMENTS

| | | | | |
|---|---|---|---|---|
| 4,425,581 | * | 1/1984 | Schweppe et al. | 345/113 |
| 5,502,503 | * | 3/1996 | Koz | 348/552 |
| 5,610,664 | * | 3/1997 | Bobert | 348/564 |
| 5,623,589 | * | 4/1997 | Needham et al. | 345/356 |
| 5,635,987 | * | 6/1997 | Park et al. | 348/564 |
| 5,673,086 | * | 9/1997 | Fukuoka et al. | 348/445 |
| 5,715,013 | * | 2/1998 | Kang | 348/564 |
| 5,717,860 | * | 2/1998 | Graber et al. | 395/200.12 |
| 5,737,558 | * | 4/1998 | Knight et al. | 345/342 |
| 5,774,123 | * | 6/1998 | Matson | 345/356 |
| 5,784,058 | * | 7/1998 | LaStrange et al. | 345/340 |
| 5,867,227 | * | 2/1999 | Yamaguchi | 348/564 |
| 5,870,770 | * | 2/1999 | Wolfe | 345/346 |
| 5,903,816 | * | 5/1999 | Broadwin et al. | 348/565 |
| 5,923,379 | * | 7/1999 | Patterson | 348/565 |
| 5,945,991 | * | 8/1999 | Britt et al. | 345/327 |
| 5,987,509 | * | 11/1999 | Portuesi | 709/217 |

* cited by examiner

Primary Examiner—John W. Miller
Assistant Examiner—Reuben M. Brown

(57) ABSTRACT

A method of simultaneously displaying two pictures on a screen of an Internet-functional television receiver (TV) capable of improving the information utility of the Internet-functional TV and providing convenience in use. The method includes the steps of determining whether or not the number of total lines of home-page data inputted from Internet to the TV exceeds a predetermined number of lines, displaying the home-page data as a single picture on the screen if the number of total lines of the home-page data is less than the predetermined number of lines as a result of determination, and dividing the home-page data into two pictures if the number of total lines of the home-page data exceeds the predetermined number of lines as a result of determination, and simultaneously displaying the two divided pictures on the screen.

7 Claims, 6 Drawing Sheets

| <PREVIOUS PAGE> | <PRESENT PAGE> |
|---|---|
| CITIES IN THE WORLD | (1) CITIES IN KOREA |
| (1) KOREA | • SEOUL |
| (2) JAPAN | • PUSAN |
| (3) U.S.A | • TAEJEON |
| (4) UNITED KINGDOM | • TAEGU |
| (5) CANADA | • - - - - - - |
| - - - - - - - - | • - - - - - |

| <PREVIOUS PAGE> | <PRESENT PAGE> |
|---|---|
| CITIES IN THE WORLD | (3) CITIES IN U.S.A |
| (1) KOREA | • WASHINGTON D.C. |
| (2) JAPAN | • NEW YORK |
| (3) U.S.A | • L A |
| (4) - - - - - - | • SAN FRANCISCO |
| (5) - - - - - | • - - - - - - - - - - |
| | • - - - - - - - - - - |

FIG. 4
<H3> Today is fine </H3> - - - - - ▶ Today is fine!
<H1> Today is fine </H1> - - - - ▶ Today is fine
FIG. 5A
(RELATED ART)
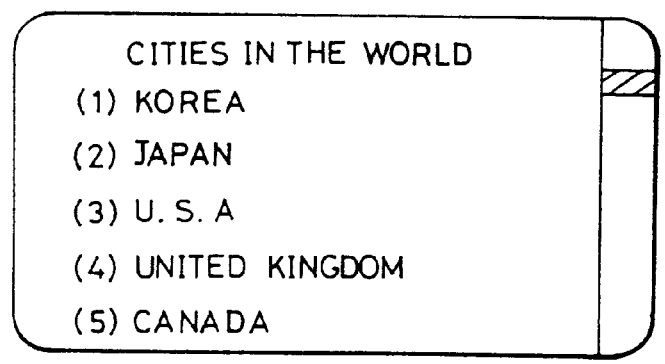
FIG. 5B
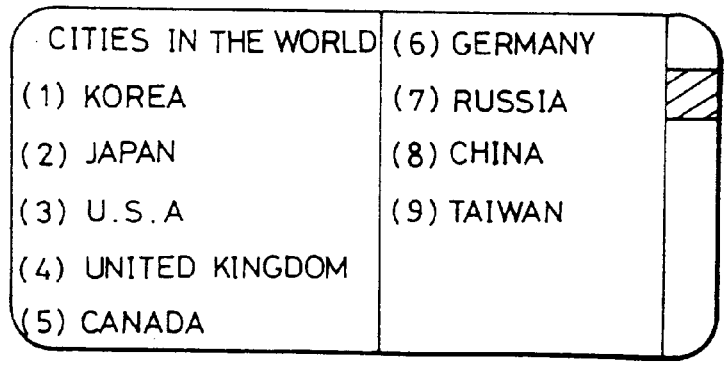

FIG. 6A

<PREVIOUS PAGE>
CITIES IN THE WORLD
(1) KOREA
(2) JAPAN
(3) U.S.A
(4) UNITED KINGDOM
(5) CANADA

<PRESENT PAGE>
(1) CITIES IN KOREA
· SEOUL
· PUSAN
· TAEJEON
· TAEGU

FIG. 6B

<PREVIOUS PAGE>
CITIES IN THE WORLD
(1) KOREA
(2) JAPAN
(3) U.S.A
(4) ----
(5) ----

<PRESENT PAGE>
(3) CITIES IN U.S.A
· WASHINGTON D.C.
· NEW YORK
· LA
· SAN FRANCISCO

FIG. 6C

<PREVIOUS PAGE>
(1) CITIES IN KOREA
· SEOUL
· PUSAN
· TAEJEON
· TAEGU

<PRESENT PAGE>
TAEGU
· DONG-GU
· SEO-GU
· NAM-GU
· BUK-GU

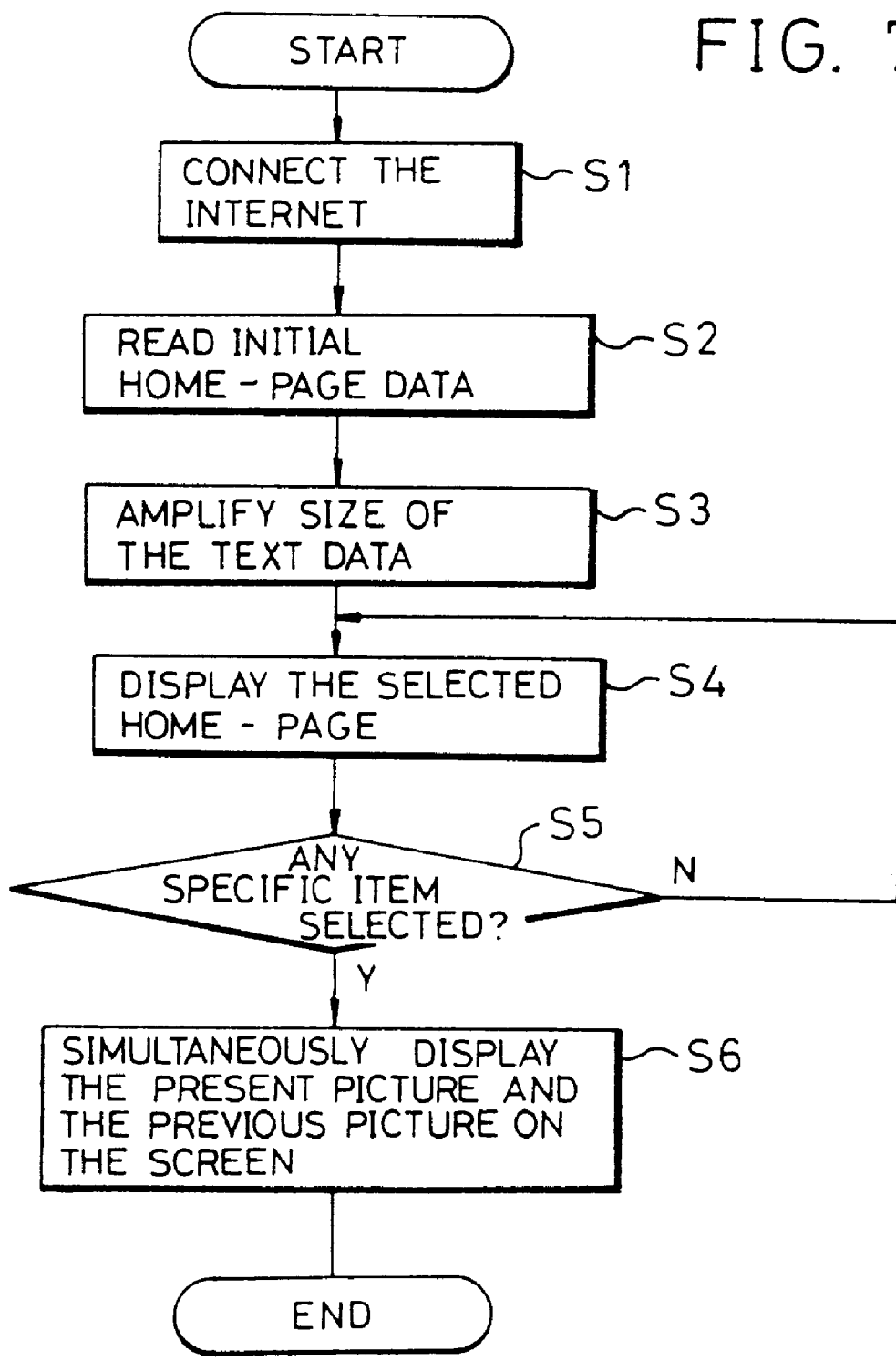

METHOD OF SIMULTANEOUS DISPLAY OF TWO PICTURES FOR INTERNET-FUNCTIONAL TELEVISION RECEIVER

BACKGROUND OF THE INVENTION

1. Field of the Invention

The present invention relates to a simultaneous display of two pictures for an Internet-functional television receiver (TV), and more particularly to a method for simultaneously displaying two pictures on the screen of an Internet-functional TV which can simultaneously display two divided pictures on the screen if input picture information to be displayed exceeds the number of lines constituting one picture.

2. Description of the Related Art

In general, Internet services provide a variety of information such as information on scientific technology, stock exchange, etc. Thus, any person who may not be an information search specialist can easily access to such information services in-house if he or she has an Internet searching system providing Internet searching functions. The information searching system providing Internet searching functions includes a personal computer (PC) or an Internet TV having a modem.

According to FIG. 1, an Internet TV 70 comprises a modem 73 built in the Internet TV for transmitting and receiving information to and from an Internet service system 72 through an external communication line 71, a microcomputer 74 for controlling searches on Internet information inputted and outputted through the modem 73, a video signal processing section 75 for converting the inputted Internet information into a video signal in accordance with a search control signal from the microcomputer 74, a display section 76 for displaying the Internet information processed by the video signal processing section 75.

The operation of the conventional Internet TV as constructed above will now be described with reference to FIG. 1.

If the user wants to use the Internet information, the user sets up an Internet function through a keypad mounted on one part of the TV 70 or a remote controller (not illustrated in the drawing). Then, the microcomputer 74 perceives the Internet function setting signal and outputs an Internet control signal to the modem 73. The modem 73 polls a communication connecting signal to the Internet service system of the Internet service server connected to the external communication line 71.

At this time, if the inputted password or user-name accords with that promised between the modem 73 and the Internet service system 72, and if any one service has been chosen from the service initial menu served from the Internet service system 72, the Internet service system 72 provides information on the chosen service to the modem 73 through the external communication line 71. Then, the modem 73 converts the inputted Internet service information into a digital signal to be inputted to the microcomputer 74. The microcomputer 74 subsequently transfers the inputted Internet service information, e.g., information of WEB pages, to the video signal processing section 75. Accordingly, the video signal processing section 75 video-processes the inputted information on the Internet WEB page information, so that the WEB page information is displayed on the screen of the display section 76.

At this time, the Internet WEB page information provided from the Internet service system 72 is not suitable for being viewed on a TV screen because it is designed to be viewed on a PC monitor. Whereas the distance between the user and the PC monitor is within about 1 meter, the distance between the user and the TV 70 is about 2–3 meters. Thus, the letters appearing on the Internet WEB page designed to be viewed on the PC monitor is too small to be viewed on the screen of the TV 70. Further, the TV 70 is not suitable for viewing letters because the resolution of the TV is lower than that of monitor.

Therefore, the display section 76 magnifies letters before display so that the user can see the magnified Internet WEB page information on the TV screen.

However, such a conventional Internet TV has a disadvantage in that it fails to display an entire information of the Internet WEB page on its screen since the number of letters that can be displayed as one picture becomes fewer when the letters are magnified. Also, only a portion of the WEB page information can be displayed on the TV screen if the amount of data contained in one WEB page exceeds the capacity of data display on the TV screen.

SUMMARY OF THE INVENTION

It is an object of the present invention to solve the problems involved in the related art and, to provide a method of simultaneously displaying two divided pictures on the screen of an Internet-functional TV which can notably improve the information utility of the Internet-functional TV by simultaneously displaying two divided pictures on the screen if input information to be displayed on the screen of the Internet-functional TV exceeds the number of lines predetermined to constitute one picture.

It is another object of the present invention to provide a method of simultaneously displaying two divided pictures on the screen of an Internet-functional TV which can facilitate information searches by the user by simultaneously displaying previous and present WEB pages on the screen of the Internet-functional TV.

According to one aspect of the present invention, there is provided a method of simultaneously displaying two pictures on a screen of an Internet-functional TV, comprising the steps of determining whether or not the number of total lines of home-page data inputted from Internet to the TV exceeds a predetermined number of lines, displaying the home-page data as a single picture on the screen if the number of total lines of the home-page data is less than the predetermined number of lines as a result of determination, and dividing the home-page data into two pictures if the number of total lines of the home-page data exceeds the predetermined number of lines as a result of determination, and simultaneously displaying the two divided pictures on the screen.

According to another aspect of the present invention, there is provided a method of simultaneously displaying two pictures on a screen of an Internet-functional TV, comprising the steps of determining whether or not a specific item is selected from home-page data inputted from Internet to the TV, and displaying a present page on one side of the screen by identifying it as a previous page, while displaying a page of a selected item on the other side of the screen by identifying it as the present page, if the specific item has been selected from inputted home-page data.

BRIEF DESCRIPTION OF THE DRAWINGS

The above objects, other features and advantages of the present invention will become more apparent by description of the preferred embodiments thereof with reference to the accompanying drawings, in which:

FIG. 4 is an exemplified view illustrating magnified text data from the Internet information processing section in FIG. 2.

FIGS. 5A and 5B are exemplified views illustrating two pictures simultaneously displayed on the screen according to an embodiment of the present invention.

FIGS. 6A to 6C are exemplified views illustrating two pictures simultaneously displayed on the screen according to another embodiment of the present invention.

FIG. 7 is a flowchart explaining the display method according to another embodiment of the present invention.

DETAILED DESCRIPTION OF THE PREFERRED EMBODIMENTS

Figure 1:
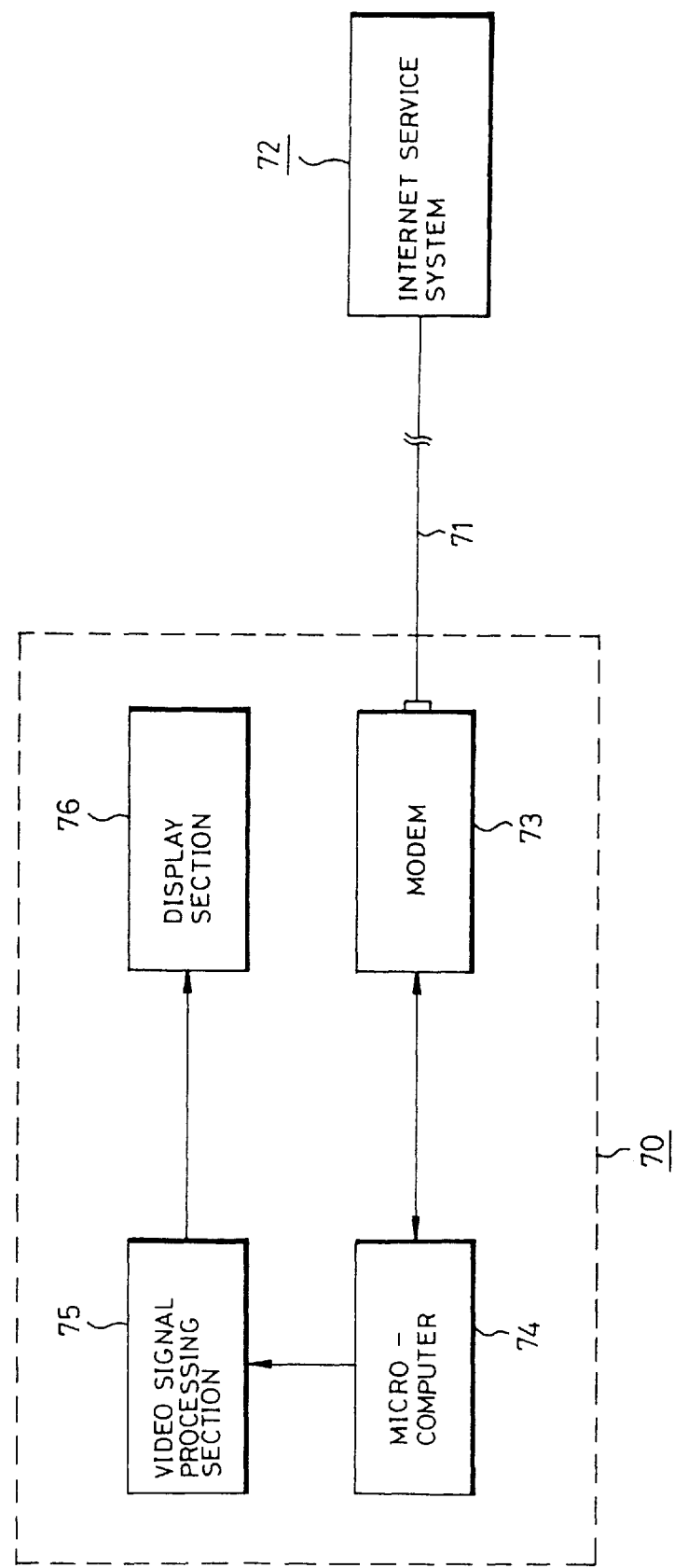
FIG. 1 is a block diagram illustrating the conventional Internet-functional TV.
Figure 2:
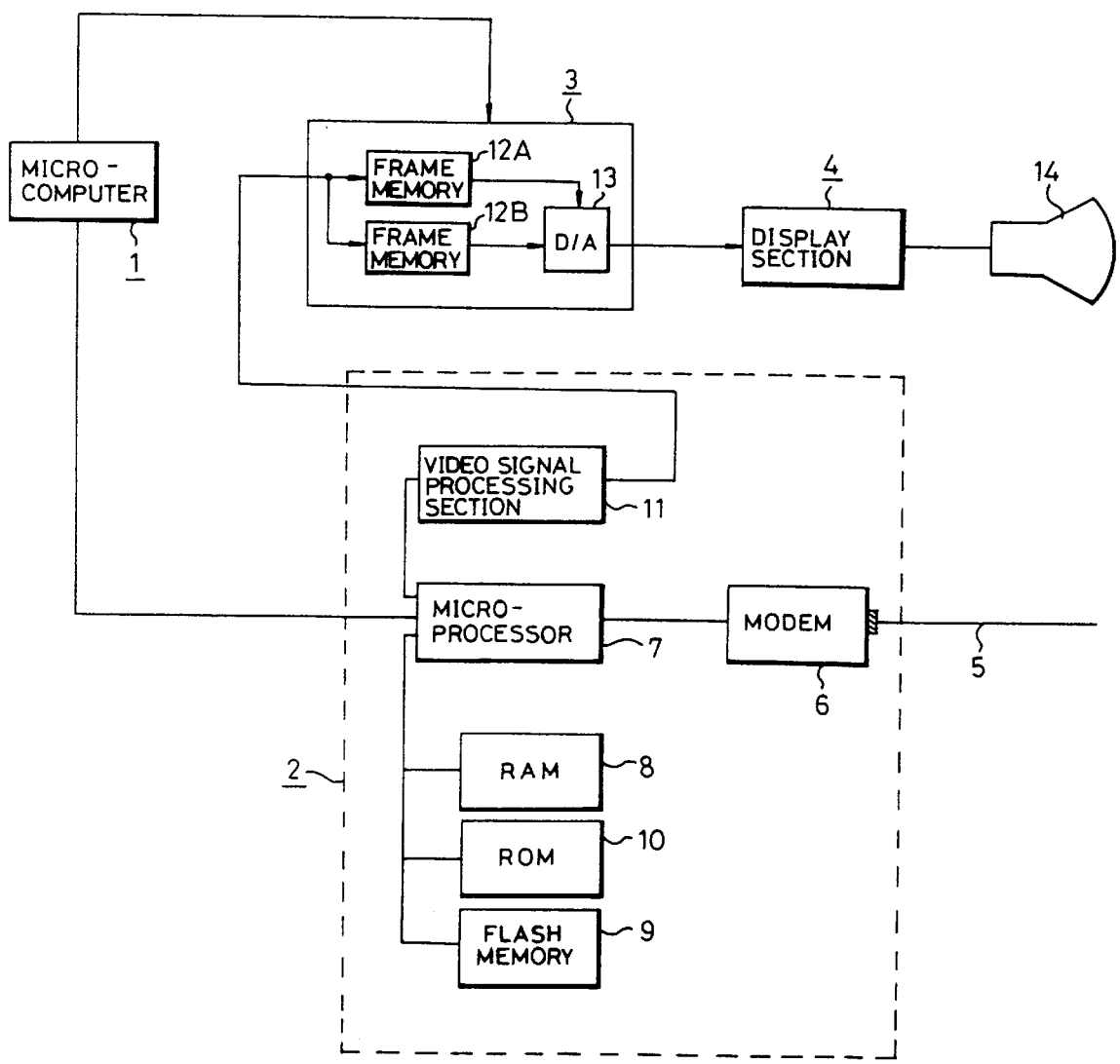
FIG. 2 is a block diagram illustrating an Internet-functional TV according to the present invention.

FIG. 2 is a block diagram illustrating an Internet-functional TV according to the present invention.

Referring to FIG. 2, the Internet-functional TV, whereby the display method according to the present invention is performed, includes a microcomputer 1 for controlling Internet communication in addition to channel selection function, an Internet information processing section 2 for receiving desired information from the Internet connected thereto, and converting the received information into a television video signal, a multi-picture processing section 3 for processing the video output signal from the Internet information processing section 2 as multiple pictures, e.g., two pictures in accordance with a multi-picture control signal from the microcomputer 1, and a display section 4 for processing and displaying on a screen of a CRT the video signal inputted from the multi-picture processing section 3.

The Internet information processing section 2 includes a modem 6 for exchanging data with the Internet through an external communication line 5, a microprocessor 7 for controlling information inputted to and outputted from the Internet in accordance with an Internet communication control signal from the microcomputer 1, a RAM 8 for storing therein information inputted to and outputted from the Internet, a flash memory 9 for receiving an electronic mail or for functioning as a cache memory of a browser in accordance with the control signal from the microprocessor 7, a ROM 10 for storing a program for performing the Internet communication, a video signal processing section 11 for converting the Internet communication information received through the modem 6 into the TV video signal, and transmitting the converted video signal to the multi-picture processing section 3.

The multi-picture video processing section 3 includes a plurality of frame memories 12A, 12B for dividing and storing therein the Internet information signal inputted from the video signal processing section 11 in accordance with the multi-picture control signal from the microcomputer 1 in case that multiple pictures, e.g., two pictures are processed to be displayed, a digital-to-analog (D/A) converter 13 for selectively converting the Internet information stored in the frame memories 12A, 12B into an analog signal and outputting the converted analog signal to the display section 4.

The display method according to an embodiment of the present invention for an Internet-functional TV as constructed above will now be explained with reference to FIGS. 2 and 3.

In the embodiment of the present invention, the inputted home-page data is divided into two pictures and the two divided pictures of the home-page data are simultaneously displayed on the screen if the number of total lines of the home-page data exceeds the number of lines constituting one picture on the screen.

Specifically, if the user inputs a specified key to search the Internet information, the microcomputer 1 detects it and inputs the Internet connection control signal to the microprocessor 7 in the Internet information processing section 2 to perform the Internet connection.

Figure 3:
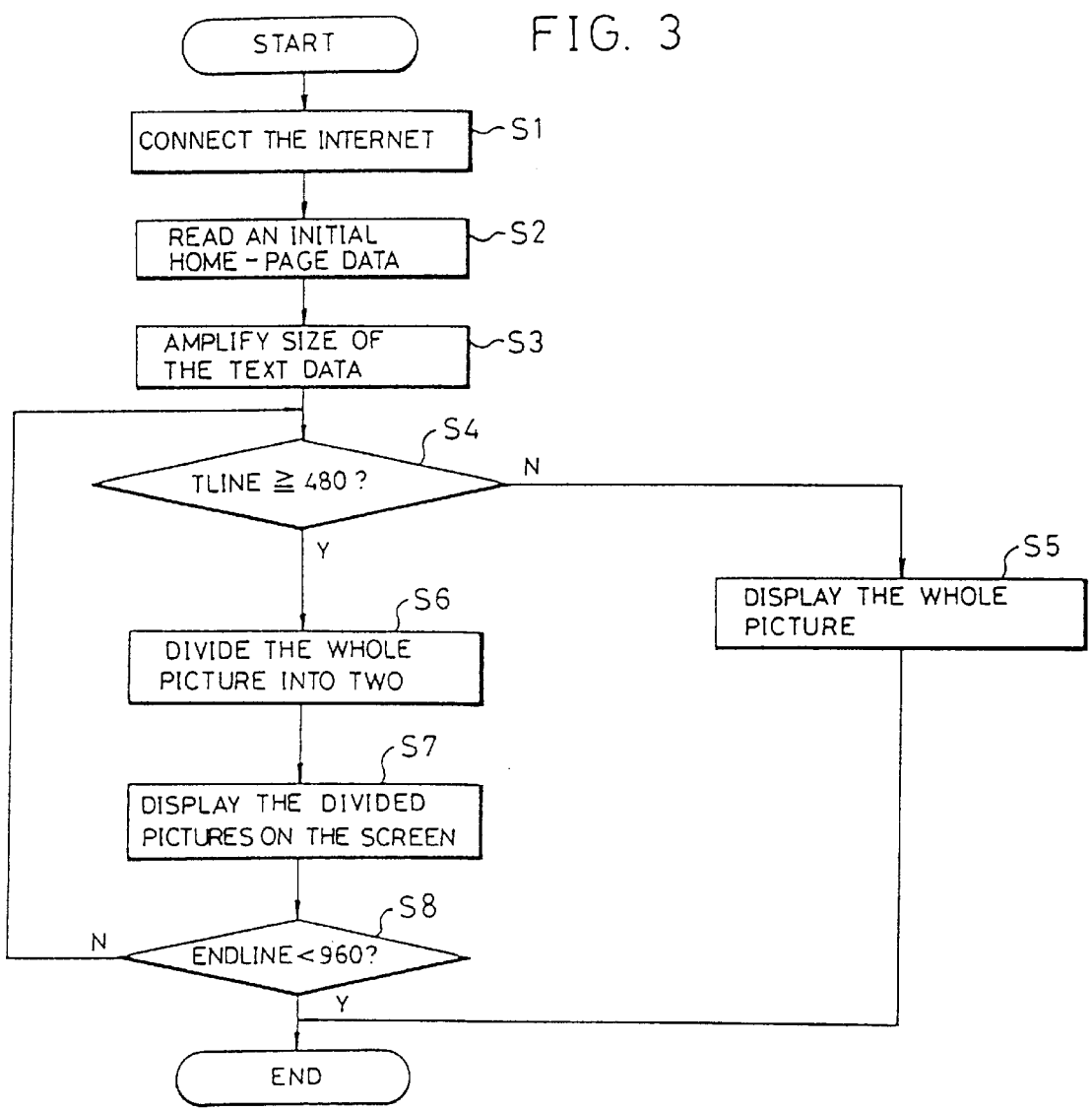
FIG. 3 is a flowchart explaining the display method according to an embodiment of the present invention.

That is, as shown in FIG. 3, the microprocessor 7 in the Internet information processing section 2 performs the Internet connection (step S1) through the modem 6 in accordance with the program stored in the ROM 10 if the Internet connection control signal is inputted from the microcomputer 1.

Thereafter, if the modem 6 is connected to the Internet, the microprocessor reads the initial information from the Internet (step S2). If the initial information is inputted from the Internet at step S2, the microprocessor magnifies the size of the information inputted from the Internet, and outputs the magnified information (step S3). Thereafter, the microprocessor determines whether or not the information currently inputted from the Internet exceeds the number of standard lines constituting one picture, e.g., 480 lines (step S4).

In other words, if the modem 6 is connected to the Internet, the microprocessor 7 stores the home-page data received from the Internet through the modem 6 in the RAM 8, and magnifies the size of the information stored in the RAM 8. The microprocessor 7 then determines whether or not the number of total lines TLINE of the home-page information exceeds the number of standard lines constituting one picture, e.g., 480 lines.

The reason for magnifying the size of the text data is that, since the information received from the Internet is loaded as a home-page designed to suit the computer monitor, the size of the text is too small to be viewed on the TV screen.

As shown in FIG. 4, the magnification of the text size is carried out by converting <hn><hn> information on the font size in the HTML text data. Thus, the text appearing on the TV screen can be easily seen from a far distance.

If the TLINE of the Internet home-page currently inputted from the Internet is less than the number of the standard lines constituting one picture, e.g., 480 lines, as a result of determination by the microprocessor 7 at step S4, the microprocessor 7 displays all the inputted Internet information as one picture (step S5).

That is, if the TLINE of the home-page inputted from the Internet is less than 480 lines, the microprocessor 7 inputs the Internet information signal to the video signal processing section 11. The video signal processing section 11 then converts the inputted Internet information signal into the TV video signal, and inputs the converted video signal to the multi-picture processing section 3. Then, the multi-picture processing section 3 stores the Internet video information inputted from the video signal processing section 11 in one of the frame memories 12A, 12B in accordance with the storage control signal from the microcomputer 1.

The Internet video information stored in either of the frame memories 12A, 12B is converted into an analog signal by the D/A converter 13, and then inputted to the display section 4. Therefore, the display section 4 displays the entire home-page inputted from the Internet as one picture on the screen of the CRT 14.

Meanwhile, if the TLINE of the home-page inputted from the Internet exceeds the number of the standard lines constituting one picture, e.g., 480 lines, as a result of determination by the microprocessor 7 at step S4, the microprocessor 7 divides the inputted Internet information into two pictures (step S6).

In other words, if TLINE of the home-page inputted from the Internet exceeds 480 lines, the microprocessor 7 informs the microcomputer 1 of this fact. Accordingly, the microcomputer 1 outputs a division control signal to the multi-picture processing section 3. The multi-picture video processing section 3 subsequently stores the video signal of the Internet information inputted from the Internet information processing section 2 up to 480 lines in the frame memory 12A, and the excessive video signal in the frame memory 12B. The multi-picture processing section 3 then successively inputs the Internet information stored in the frame memories 12A, 12B to the D/A converter 13. The D/A converter 13 successively converts the inputted Internet information into the analog signal and transmits the analog signal to the display section 4. The display section 4 then displays two pictures of the Internet information on the screen of the CRT 14 by vertically dividing the screen of the CRT 14 into two, i.e., a left side of the screen for the lines from 1 to 480, and a right side of the screen for the lines from 481 to 959.

According to the conventional Internet-functional TV, if the TLINE of the Internet home-page exceeds 480 lines, the home-page information only up to 480 lines is displayed with the lines thereafter not displayed as shown in FIG. 5A. According to the display method of the present invention, however, the user can see the entire information of the home-page since the two pictures including the home-page information after 480 lines are simultaneously displayed on the screen of the CRT 14 as shown in FIG. 5B.

According to another embodiment of the present invention, the present home-page is simultaneously displayed with the previous home-page of the Internet if the user selects a specified item from the home-page information displayed on the screen of the CRT 14.

Specifically, if the Internet connection control signal is inputted from the microcomputer 1, the microprocessor 7 in the Internet information processing section 2 performs the Internet connection (step S1) through the modem 6 in accordance with the program stored in the ROM 10 as shown in FIG. 7. If the modem 6 is connected to the Internet, the microprocessor 7 reads the initial information from the Internet (step S2). If the initial information is inputted from the Internet at step S2, the microprocessor 7 magnifies the size of the information inputted from the Internet, and outputs the magnified information (step S3). Thereafter, the microprocessor 7 displays the home-page information inputted from the Internet (step S4), and then determines whether or not any specified item is selected from the current home-page (step S5). If no specified item is selected from the home-page displayed on the screen of the CRT 14, the microprocessor 7 returns to the home-page display step S4. If any specified item is selected from the current home-page displayed on the screen at step S5, however, the microprocessor 7 simultaneously displays the previous home-page on the left active window of the screen and the present home-page on the right active window of the screen (step S6).

If the user inputs a specified key to search information from the Internet, the microcomputer 1 detects the key input, and performs the Internet connection by inputting the Internet connection control signal to the microprocessor 7 in the Internet information processing section 2. At this time, if the modem 6 is connected to the Internet, the microprocessor 7 stores the home-page data received from the Internet through the modem 6 in the RAM 8, and magnifies the size of the Internet text data stored in the RAM 8. Thereafter, the microprocessor 7 inputs the magnified Internet text data to the video signal processing section 11. Then, the video signal processing section 11 converts the inputted Internet text data into the TV video signal, and inputs the converted video signal to the multi-picture processing section 3. The multi-picture processing section 3 stores the Internet text data inputted from the video signal processing section 11 in the frame memories 12A, 12B in accordance with the storage control signal from the microcomputer 1, and provides the stored Internet text data to the D/A converter 13. The D/A converter 13 converts the inputted Internet home-page data into the analog signal and outputs the analog signal to the display section 4. Accordingly, the display section 4 displays all the home-page data on the screen of the CRT 14.

During the operation as above, if the user selects any specified item desired to be searched from the present home-page displayed on the screen of the CRT 14, the microcomputer 1 receives a home-page of the selected item from the Internet through the Internet information processing section 2. Then, the microprocessor 7 in the Internet information processing section 2 magnifies and provides the Internet text data inputted from the Internet through the modem 6 to the video signal processing section 11. The video signal processing section 11 converts the magnified Internet text data into the TV video signal, and stores the converted video signal in the frame memories 12A, 12B in the multi-picture processing section 3. Thereafter, the D/A converter 13 in the multi-picture processing section 3 sequentially converts the video signal stored in the frame memories 12A, 12B into the analog signal to output the analog signal to the display section 4. As a result, the display section 4 simultaneously displays the specified Internet home-page selected by the user and the previous Internet home-page on the screen of the CRT 14 as shown in FIG. 6A.

Also, if the user selects another item of the previous home-page, for example, "U.S.A" as shown in FIG. 6B when the two home-pages are simultaneously displayed on the screen as shown in FIG. 6A, the previous home-page is maintained, but the present home-page is removed and then a new home-page for the "U.S.A" information is displayed instead. Meanwhile, if the user selects another item of the present home-page, for example, "Taegu" as shown in FIG. 6C when the two home-pages are simultaneously displayed as shown in FIG. 6A, the present home-page is displayed on the display region of the previous home-page as the previous page, and the new home-page for "Taegu" information is displayed on the display region of the present home-page as the present page.

As described above, according to the present invention, information utility of Internet-function TV display is greatly improved by dividing input information into two pictures, and simultaneously displaying the two divided pictures on the screen if the input information exceeds the amount of data constituting one picture. Further, the previous WEB page and the present WEB page can be simultaneously displayed on the screen, thereby providing the facility of information searches to the user.

While the present invention has been described and illustrated herein with reference to the preferred embodiments thereof, it will be understood by those skilled in the art that various changes in form and details may be made therein without departing from the spirit and scope of the invention.

What is claimed is:

1. A television receiver comprising:

a display; and a controller for determining if a specific item is selected from a page of data received from a remote subscriber system, said controller displaying the page of data at a first portion of said display identified as a previous page while simultaneously displaying a new page of data of a specific item selected from the page of data at a second portion of said display identified as a present page, upon determining that the specific item has been selected from the page of data, and wherein said controller magnifies and then displays the page of data, prior to determining if a specific item is selected from the page of data.

2. The television receiver of claim 1, wherein said controller magnifies the page of data by increasing font size of the page of data.

3. The television receiver of claim 1, wherein the remote subscriber system is the Internet and the page of data is home-page data.

4. The television receiver of claim 1, further comprising a modem for receiving the page of data over a communication line from the remote subscriber system and providing the page of data to said controller.

5. A television receiver comprising:

a display; and a controller for determining if a specific item is selected from a page of data received from a remote subscriber system, said controller displaying the page of data at a first portion of said display identified as a previous page while simultaneously displaying a new page of data of a specific item selected from the page of data at a second portion of said display identified as a present page, upon determining that the specific item has been selected from the page of data, and wherein said controller magnifies and then displays the page of data, prior to determining if a specific item is selected from the page of data, and wherein upon determination that an additional specific item is selected from the new page of data displayed as the present page, said controller displays the new page of data at the first portion of said display identified as the previous page while simultaneously displaying another new page of data of the additional specific item selected from the new page of data at the second portion of said display identified as the present page.

6. A television receiver comprising:

a display; and a controller for determining if a specific item is selected from a page of data received from a remote subscriber system, said controller displaying the page of data at a first portion of said display identified as a previous page while simultaneously displaying a new page of data of a specific item selected from the page of data at a second portion of said display identified as a present page, upon determining that the specific item has been selected from the page of data, and wherein said controller magnifies and then displays the page of data, prior to determining if a specific item is selected from the page of data, and wherein upon determination that an additional specific item is selected from the page of data displayed as the previous page, said controller displays the page of data at the first portion of said display identified as the previous page while simultaneously displaying another new page of data of the additional specific item selected from the page of data on the second portion of said display identified as the present page.

7. The television receiver of claim 1, wherein the first portion is at a left side of said display and the second portion is at a right side of said display.

* * * * *